Patented Mar. 12, 1940

2,193,438

UNITED STATES PATENT OFFICE 2,193,438

AZO DYESTUFFS

Carl Taube, Leverkusen-I. G.-Werk, Richard Stüsser, Cologne, and Otto Müller, Leverkusen-I. G.-Werk, Germany, assignors to General Aniline & Film Corporation, a corporation of Delaware No Drawing. Application September 7, 1938, Serial No. 228,760. In Germany September 7, 1937

4 Claims. (Cl. 260—161)

The present invention relates to new azo dyestuffs and to a method of preparing the same.

In British specification 14620/1890 azo dyestuffs are described, obtained by coupling tetrazotized diaminodiphenoxy-acetic acid with hydroxy or amino derivatives of the benzene and naphthalene series, and the capability of these dyestuffs to form copper compounds is mentioned. The shades, thus obtained, of the dyeings aftertreated with copper sulfate range from brown to blue to green.

It has now been found that by combining diaminodiphenoxy-acetic acid with such compounds, the coupling of which takes place at a reactive keto-methylene grouping, dyestuffs are obtained which differ in their properties from the dyestuffs of the above mentioned specification. Compounds containing a keto-methylene grouping capable of coupling are, for example, pyrazolones, acetoacetic arylides of the benzene or naphthalene series, dihydroxy quinoline, dihydro-resorcinol, and others, whereby the two components necessary for the coupling may be identical or different.

Our new dyestuffs correspond to the following general formula:

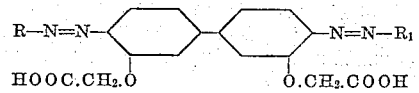

wherein R and $R_1$ stand for radicals of compounds containing a reactive keto-methylene grouping.

Our new dyestuffs are, in the form of their alkali metal salts, soluble in water and dye cotton directly red shades. The new dyestuffs can be aftertreated, in substance or on the fiber, with agents yielding metals, as, for instance, with copper, chromium or a combination of copper and chromium salts. If the aftertreatment takes place on the fiber, shades of improved fastness to washing and light are obtained. While until now, by aftertreatment of metal complex forming azo-dyestuffs with metal salts, the shades of the metal-containing dyestuff had become essentially duller than the shade of the metal-free dyestuff, the metal compounds of the new dyestuffs show the same or even an improved clearness in comparison with the metal-free compounds. Metal-, especially copper-containing red cotton dyestuffs of such a clearness have not yet been prepared.

The following examples illustrate the invention, without, however, restricting it thereto, the parts being by weight:

Example 1

1 molecular proportion of 4.4′-diamino-3.3′-diphenoxy-acetic acid is tetrazotized, in the usual manner, with sodium nitrite and hydrochloric acid, and coupled in sodium carbonate alkaline solution with 2 molecular proportions of 1-m-aminophenyl-3-methyl-5-pyrazolone. The coupling is very quickly finished. The disazodyestuff thus formed is precipitated by adding salt, and filtered off. It corresponds, in the free state, to the following formula:

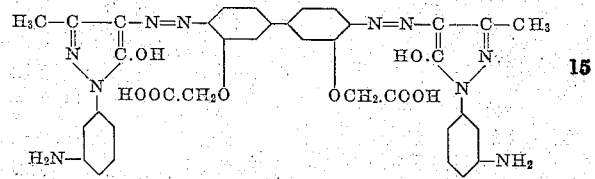

The dyestuff is a dark powder which dissolves in water with yellowish-red color and dyes cotton brownish-red shades. By aftertreating the dyeing with a mixture of sodium dichromate and copper sulfate in acetic solution at 85° C., a yellowish-red fast to washing is obtained. The dyestuff goes just as well on unweighted silk and yields thereon, when aftertreated with copper salts, a red dyeing of good fastness to water and washing.

Example 2

1 molecular proportion of 4.4′-diamino-3.3′-diphenoxy-acetic acid is tetrazotized and coupled in acetic medium with 1 molecular proportion of 1-(3′-aminophenyl)-3-methyl-5-pyrazolone. When the coupling is complete, the liquor is rendered alkaline by sodium carbonate and 1 molecular proportion of 1-phenyl-3-methyl-5-pyrazolone, dissolved in hot water and some sodium hydroxide solution is added. The mixture is stirred in the presence of sodium carbonate until the coupling is finished. The dyestuff is completely precipitated by adding a small amount of sodium chloride solution, filtered and dried. The dyestuff, which in the free state corresponds to the following formula:

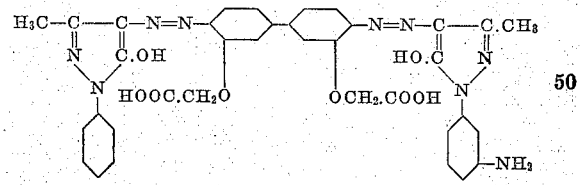

is a red powder which dissolves in hot water with yellow-red coloration and dyes cotton and viscose red shades. By aftertreatment with copper salts, the dyeings become clearer and faster to washing.

tion, filtered, and the complex copper compound of the dyestuff is precipitated from the filtrate by adding salt. The complex copper compound corresponding to the formula:

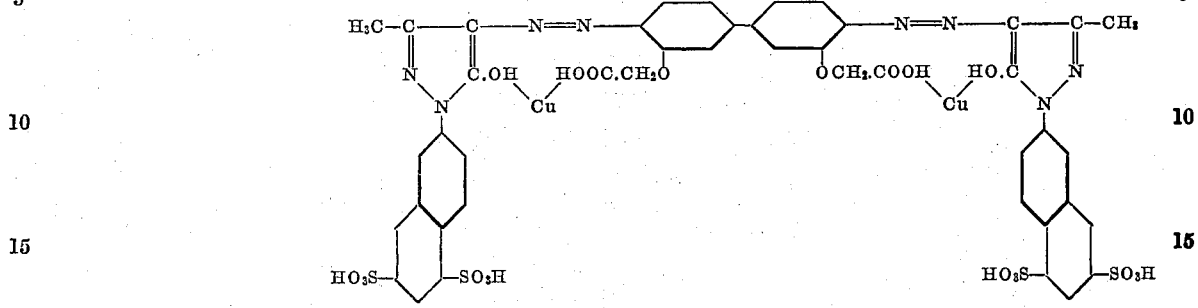

Example 3

The dyestuff corresponding, in the free state, to the following formula:

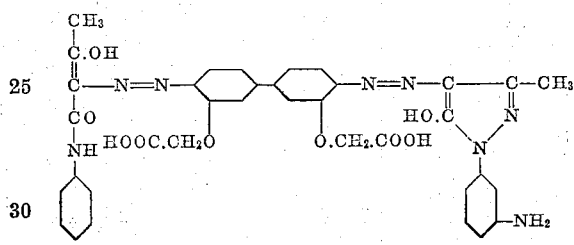

prepared in analogous manner from 1 molecular proportion of tetrazotized 4,4'-diamino-3,3'-diphenoxy-acetic acid, 1 molecular proportion of 1-(3'-aminophenyl)-3-methyl-5-pyrazolone and 1 molecular proportion of acetoacetic anilide is a brownish-red powder, which dissolves in water with red coloration, dyes cotton red shades and changes by aftertreatment with copper salts into a clear yellowish-red fast to washing.

Example 4

According to the process of Example 2, a dyestuff can also be prepared from 1 molecular proportion of tetrazotized 4,4'-diamino-3,3'-diphenoxy-acetic acid, 1 molecular proportion of 1-(3'-sulfophenyl)-3-methyl-5-pyrazolone and 1 molecular proportion of 1-phenyl-3-methyl-5-pyrazolone; it corresponds, in the free state, to the following formula:

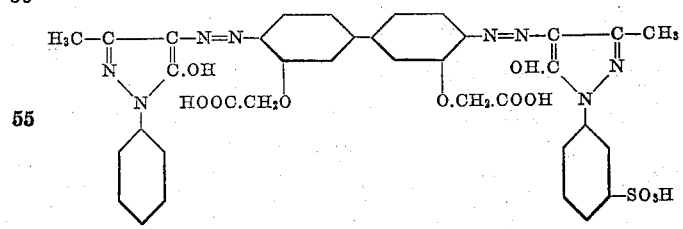

The dried dyestuff is a dark powder which easily dissolves in water with yellowish-red coloration and is capable of dyeing cotton. The dyeing on cotton becomes faster to washing and light when after treated with copper salts.

Example 5

1 molecular proportion of 4,4'-diamino-3,3'-diphenoxy-acetic acid is tetrazotized, in the usual manner, and coupled in a sodium carbonate alkaline solution with 2 molecular proportions of 1-(5'.7'-disulfo-2'-naphthyl)-3-methyl-5-pyrazolone, and when the coupling is complete an aqueous solution of 2 molecular proportions of copper sulfate are added. The mixture is rendered alkaline by adding sodium carbonate soluis a brick-red powder which dissolves in water with red coloration and dyes cotton red shades. In dyeing half-wool, the compound shows the advantage of dyeing only the cotton and not the wool fiber.

Example 6

1 molecular proportion of tetrazotized 4,4'-diamino-3,3'-diphenoxy-acetic acid is coupled in acetic solution with 1 molecular proportion of 1-phenyl-5-pyrazolone-3-carboxylic acid. After formation of the diazomonoazodyestuff the acid present is neutralized with sodium bicarbonate and 1 molecular proportion of 1-(3'-aminophenyl)-3-methyl-5-pyrazolone is added. The coupling to the disazodyestuff is completed by adding sodium carbonate solution. The dyestuff which, in the free state, corresponds to the following formula:

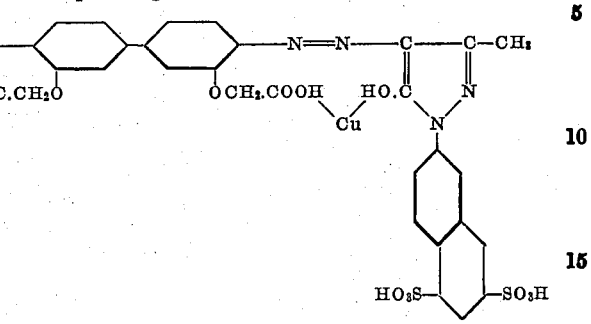

is precipitated by adding salt, filtered and dried. It is a dark powder, soluble in water and dyes cotton brown-red shades. By aftertreating the dyeing with copper salts, a bluish red is obtained.

Example 7

If, in the preparation of the dyestuff, according to Example 6, 1-(3'-aminodiphenyl)-3-methyl-5-pyrazolone is replaced by acetoacet-o-anisidide, a dyestuff is obtained which yields yellowish-red shades when aftertreated with copper salts. If the 1-(3'-aminodiphenyl)-3-methyl-5-pyrazolone is replaced by acetoacet-β-naphthylamide, a dyestuff of somewhat decreased solubility dyeing similar shades is obtained.

Example 8

1 molecular proportion of tetrazotized 4,4'-diamino-3,3'-diphenoxy-acetic acid is coupled in acetic solution with 1 molecular proportion of 1-(8'-sulfo-2'-naphthyl)-3-methyl-5-pyrazolone. When the coupling is complete, the liquor is neutralized with sodium bicarbonate and 1 molecular proportion of 1-(3'-amino-phenyl)-3-methyl-5-pyrazolone, dissolved in a small amount of sodium hydroxide solution, is added. The mixture is rendered alkaline by adding sodium carbonate solution and is stirred for some time. When the coupling is complete, the dyestuff which corresponds, in the free state, to the following formula:

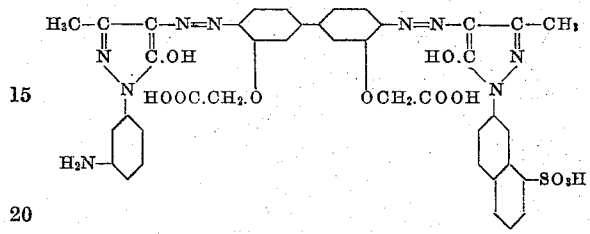

is precipitated by adding salt, filtered and dried. It is a dark powder which dissolves in water and dyes cotton blue-red shades. By aftertreatment with copper salts, red shades are obtained.

We claim:

1. As a new product the azo dyestuff corresponding, in its free state, to the formula

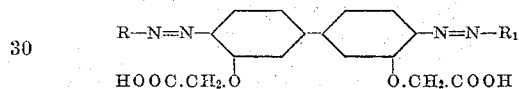

wherein R and R₁ stand for radicals of the group consisting of pyrazolones and acetoacetarylamides, being in form of their alkali metal salts soluble in water and dyeing vegetable fibers, regenerated cellulose and silk red shades which yield similar shades of improved fastness to washing and light when aftertreated with agents yielding metal.

2. As a new product, the azo dyestuff corresponding, in its free state, to the formula:

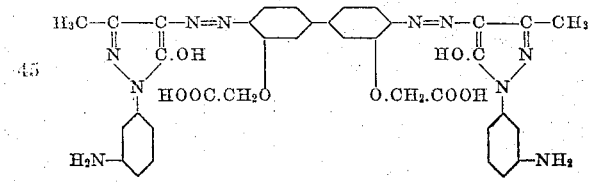

dyeing cotton brownish-red shades, which change into yellowish-red shades of improved fastness to washing and light when aftertreated with a mixture of copper and chromium salts.

3. As a new product, the azo dyestuff corresponding, in its free state, to the formula:

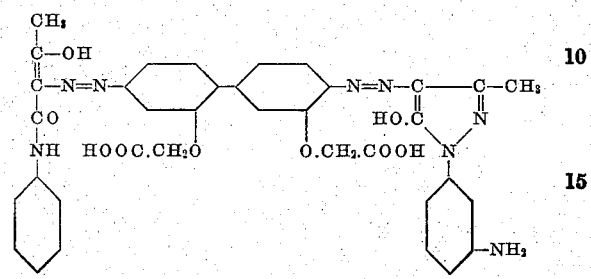

dyeing cotton red shades, which change into clear yellowish red shades of improved fastness to washing and light when aftertreated with copper salts.

4. As a new product, the azo dyestuff corresponding, in its free state, to the formula

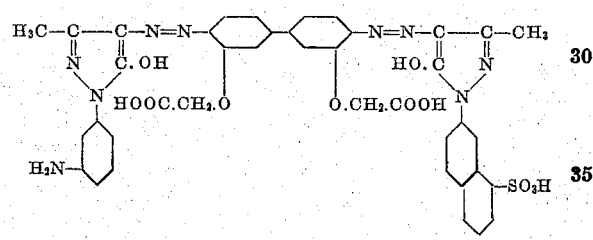

dyeing cotton blue-red shades, which change into red shades of improved fastness to washing and light when aftertreated with copper salts.

CARL TAUBE.
RICHARD STÜSSER.
OTTO MÜLLER.